No. 736,118. PATENTED AUG. 11, 1903.
G. LANGER.
MACHINE FOR MAKING WIRE FABRIC.
APPLICATION FILED MAY 23, 1902.
NO MODEL. 7 SHEETS—SHEET 1.

FIG. I.

WITNESSES:
Herbert Bradley
Fred Kirchner

INVENTOR
Gotthold Langer
by Dennis Wolcott
Att'y.

No. 736,118. PATENTED AUG. 11, 1903.
G. LANGER.
MACHINE FOR MAKING WIRE FABRIC.
APPLICATION FILED MAY 23, 1902.
NO MODEL. 7 SHEETS—SHEET 3.

No. 736,118. PATENTED AUG. 11, 1903.
G. LANGER.
MACHINE FOR MAKING WIRE FABRIC.
APPLICATION FILED MAY 23, 1902.
NO MODEL. 7 SHEETS—SHEET 4.
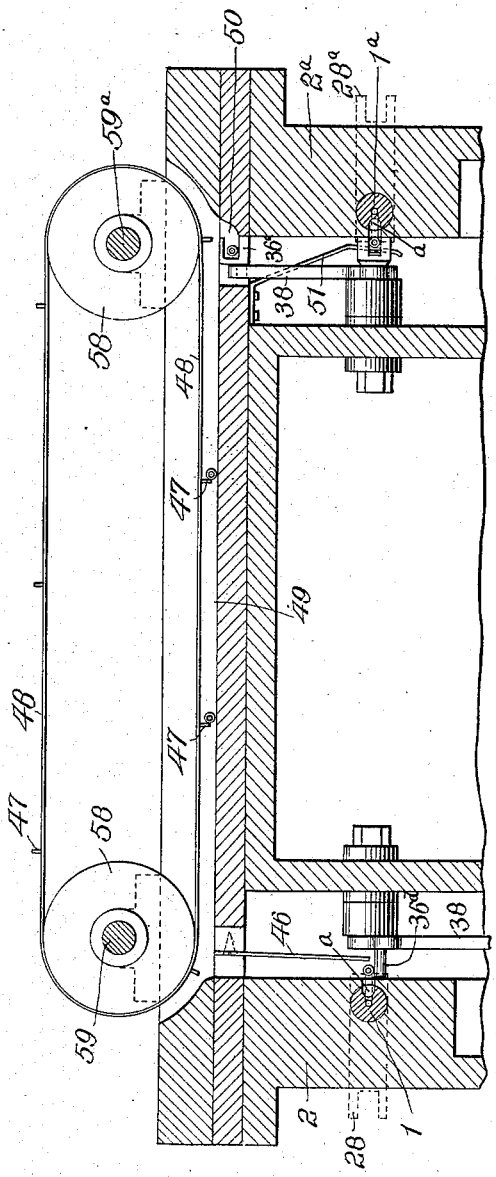
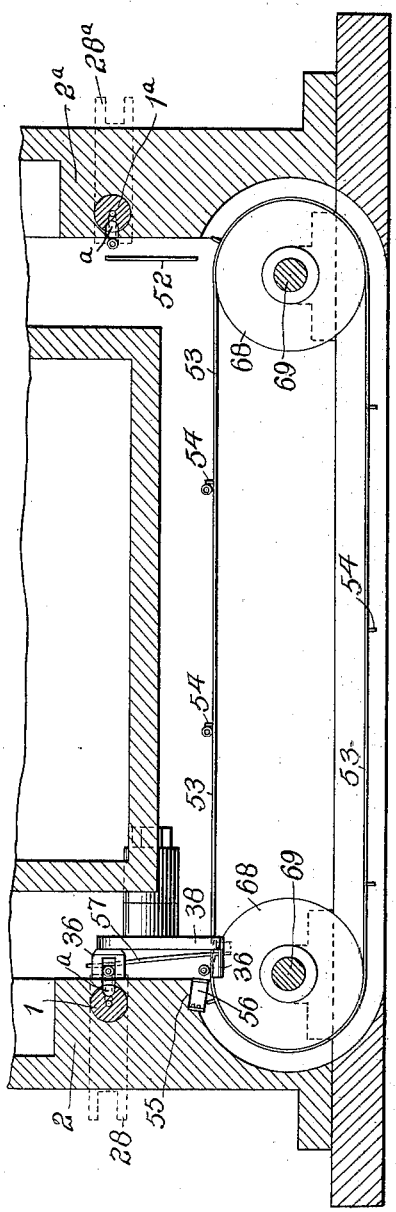
WITNESSES:
Herbert Bradley
Fred Kirchner
INVENTOR
Gotthold Langer
by Samuel S. Wolcott Att'y.

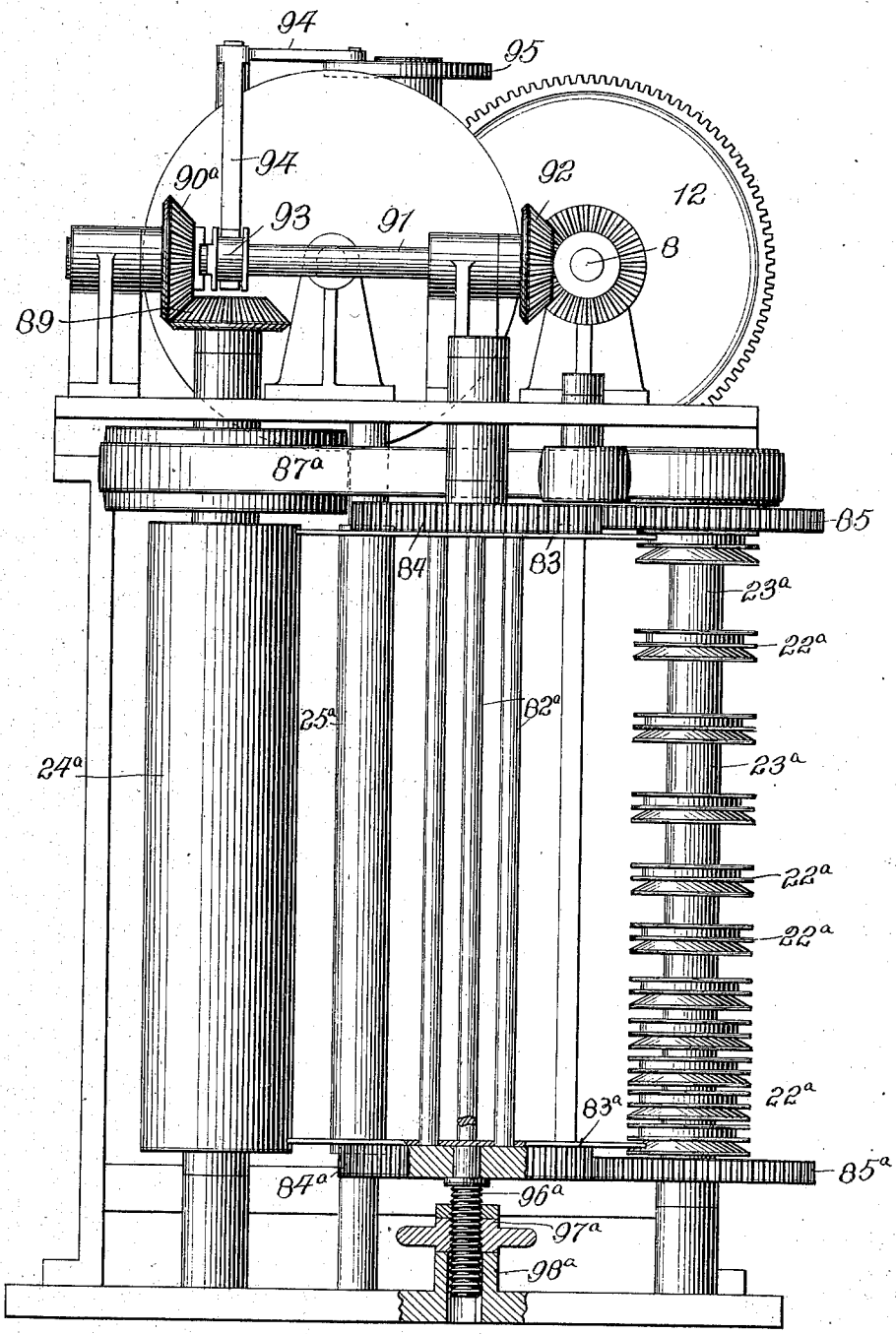

No. 736,118. PATENTED AUG. 11, 1903.
G. LANGER.
MACHINE FOR MAKING WIRE FABRIC.
APPLICATION FILED MAY 23, 1902.
NO MODEL. 7 SHEETS—SHEET 6.
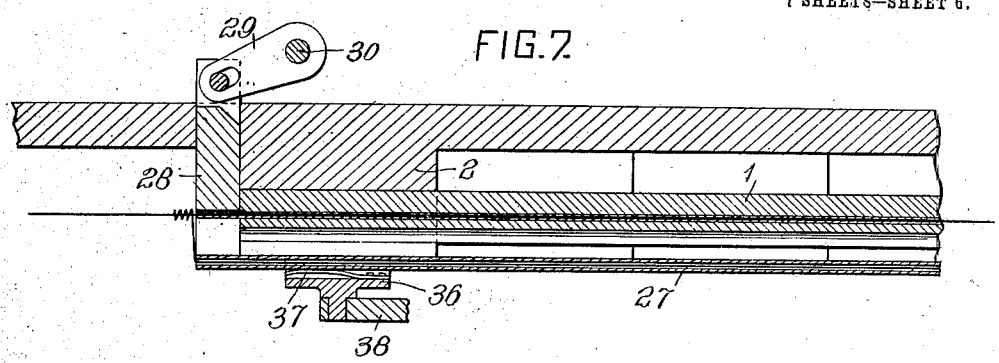
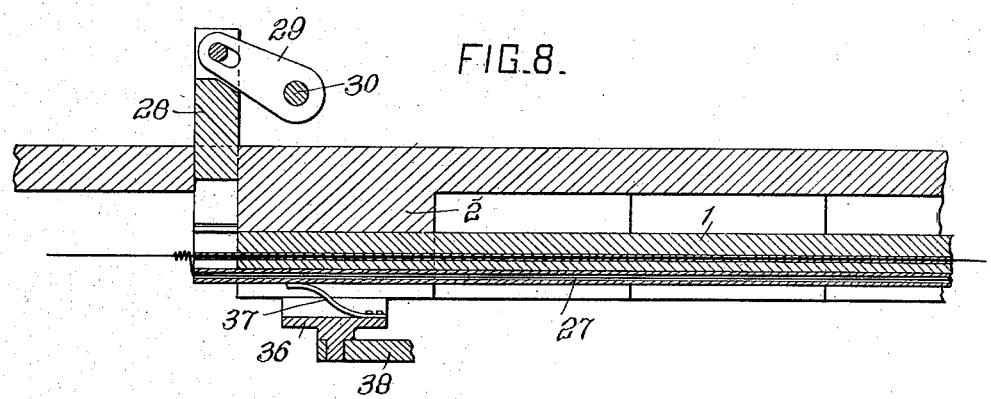
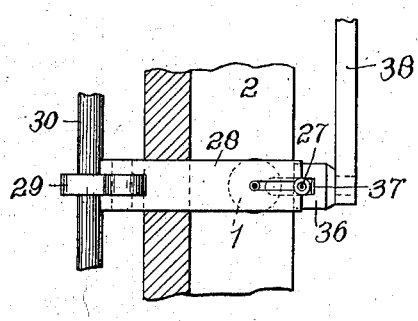
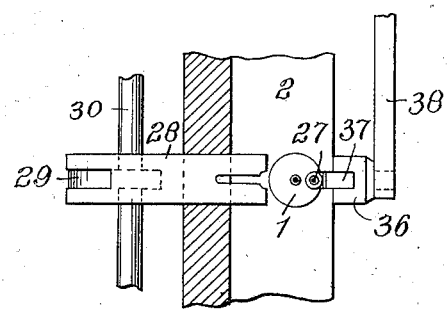
WITNESSES:
Herbert Bradley
Fred Kirchner
INVENTOR
Gotthold Langer
by Damon B. Wolcott Att'y.

No. 736,118. PATENTED AUG. 11, 1903.
G. LANGER.
MACHINE FOR MAKING WIRE FABRIC.
APPLICATION FILED MAY 23, 1902.
NO MODEL. 7 SHEETS—SHEET 7.

WITNESSES:
Herbert Bradley.
Fred Kirchner.

INVENTOR
Gotthold Langer
by Darwin S. Wolcott Att'y.

No. 736,118. Patented August 11, 1903.

UNITED STATES PATENT OFFICE.

GOTTHOLD LANGER, OF MONONGAHELA, PENNSYLVANIA, ASSIGNOR TO ELISHA C. MATHEWS, OF DONORA, PENNSYLVANIA.

MACHINE FOR MAKING WIRE FABRIC.

SPECIFICATION forming part of Letters Patent No. 736,118, dated August 11, 1903.

Application filed May 23, 1902. Serial No. 108,670. (No model.)

*To all whom it may concern:*

Be it known that I, GOTTHOLD LANGER, a citizen of the United States, residing at Monongahela, in the county of Washington and State of Pennsylvania, have invented or discovered certain new and useful Improvements in Machines for Making Wire Fabric, of which improvements the following is a specification.

The invention described herein relates to certain improvements in the manufacture of wire fences, and has for its object a construction wherein are employed wire-wrapping elements rotatable around the strand-wires—such, for example, as a cylinder through which the strand-wires are passed—said element being adapted to carry sections or lengths of stay-wire, this function being effected in the case of the cylindrical wrappers by forming grooves on the sides of the latter for the reception of wrapping-tubes containing the stay-wires, the grooves being eccentric to the passage of the strand-wires, so that the stay-wires may be carried around on the rotation of the cylinder. Provision is also made for the transfer of the stay-wires from one twisting or wrapping element or cylinder to the next one and progressively from one outer strand to the other outer strand of each panel.

The invention is hereinafter more fully described and claimed.

Figure 1:
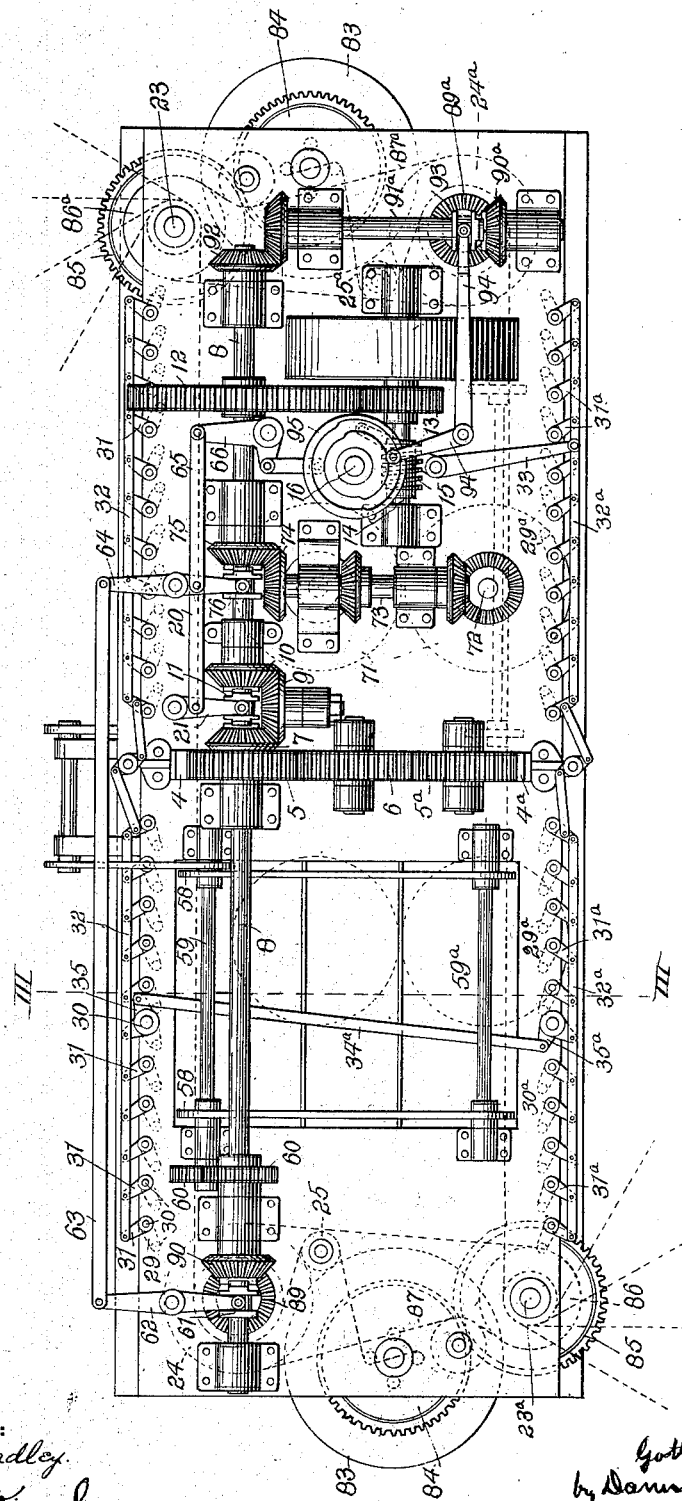
Figure 2:
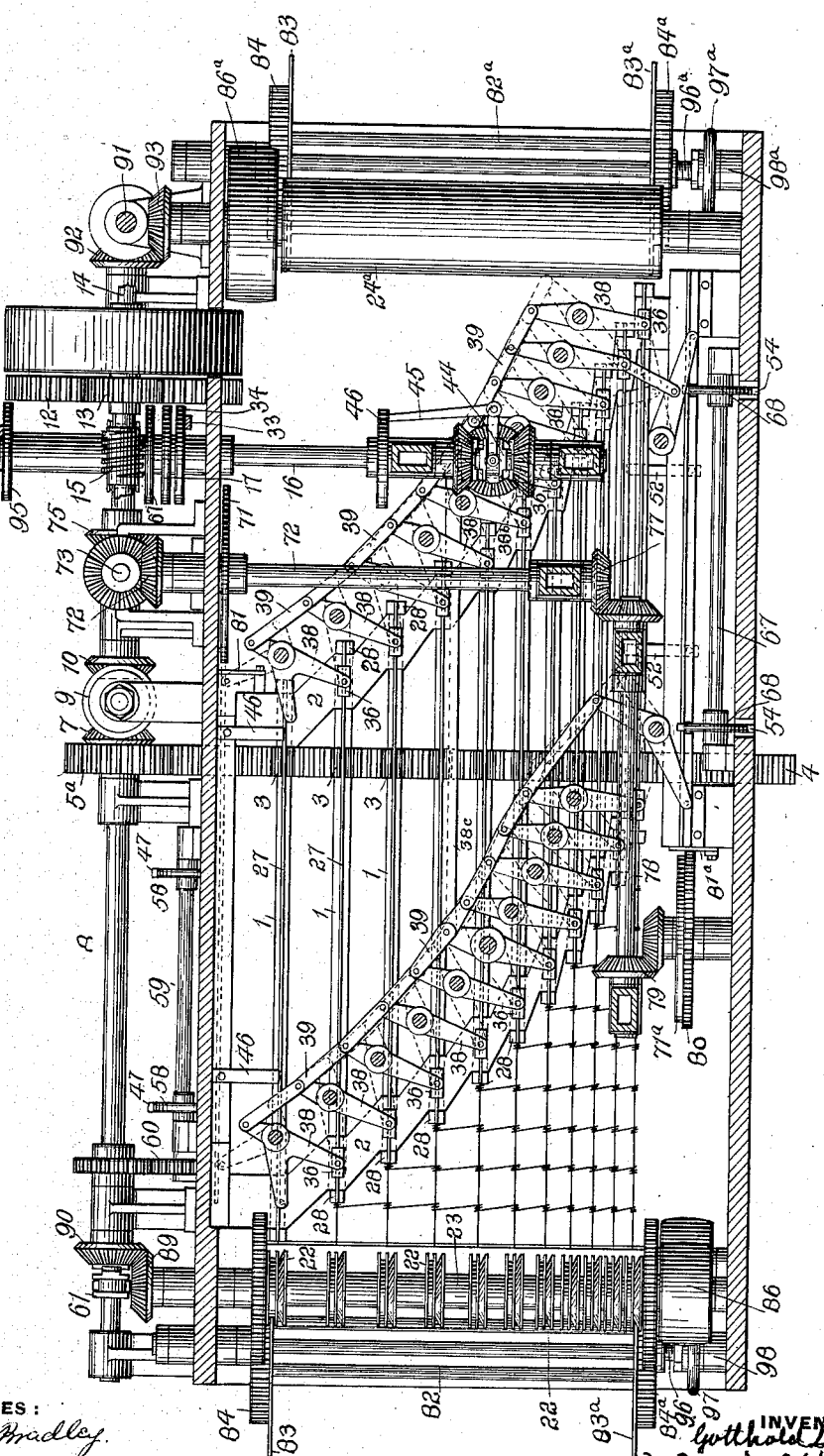
Figure 3:
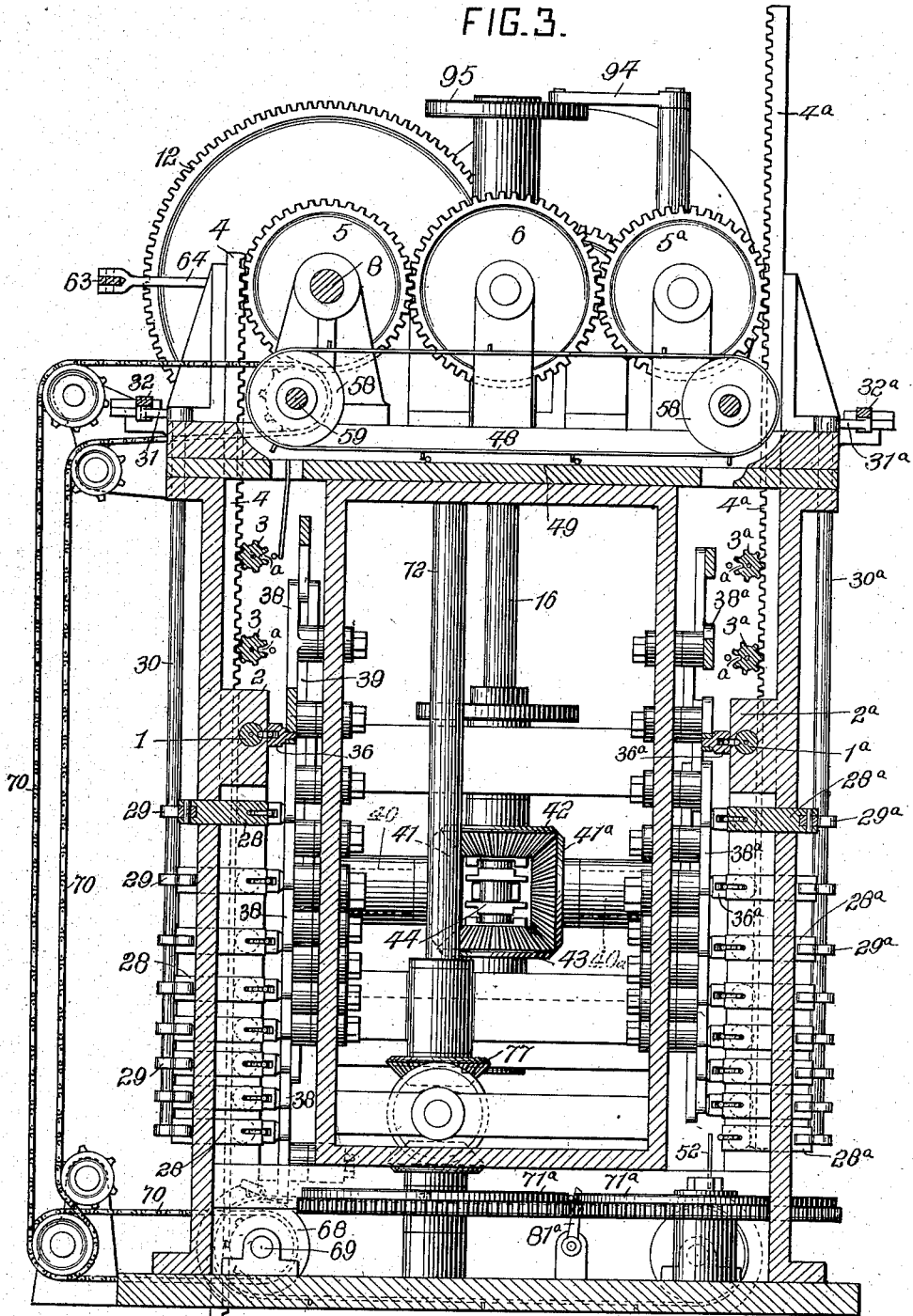
Figure 11:
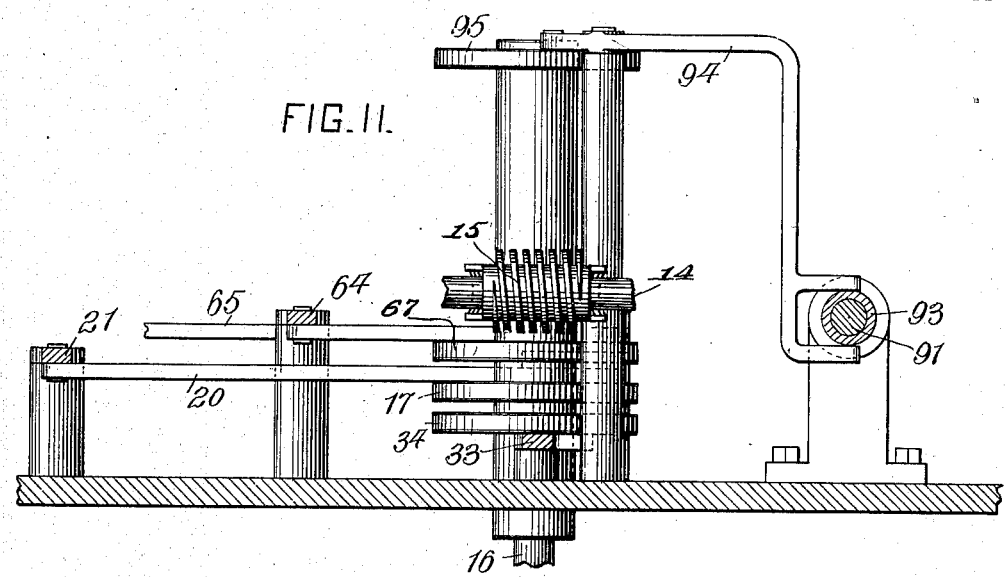
Figure 12:
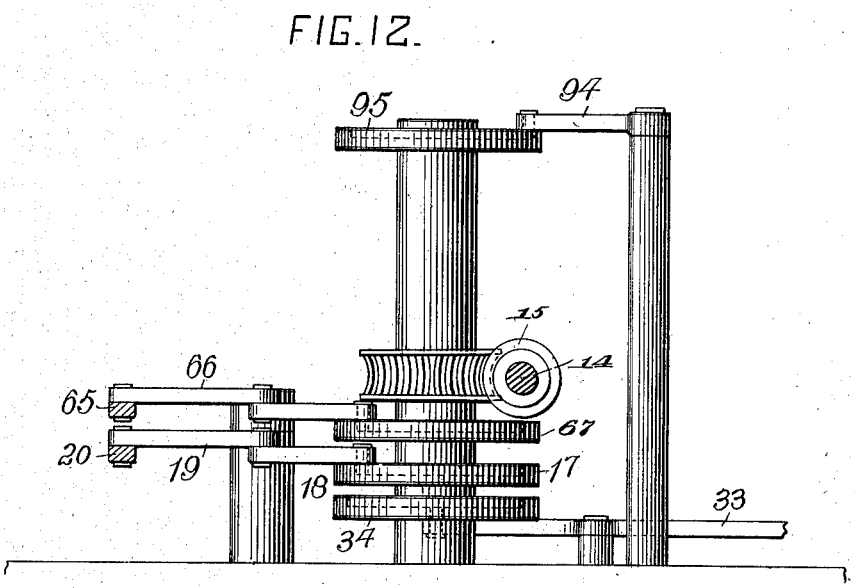

In the accompanying drawings, forming a part of this specification, Figure 1 is a top plan view of my improved machine. Fig. 2 is a sectional elevation of the same. Fig. 3 is a transverse section on a plane indicated by the line III III, Fig. 1. Figs. 4 and 5 are enlarged sectional details illustrating the mechanism for transferring the stay-wire tubes from one side of the machine to the other, Fig. 4 illustrating the transfer across the top of the machine, and Fig. 5 the transfer in the opposite direction across the bottom of the machine. Fig. 6 is a view in elevation of one end of the machine. Figs. 7, 8, 9, and 10 are enlarged sectional detail views illustrating the two transfer mechanisms, and Figs. 11 and 12 are detail views showing the controlling cams and levers leading to the various clutch mechanisms.

In the practice of my invention it is preferred to so construct the machine that two panels are formed simultaneously, one on each side of the machine, so that the stay-wire tubes can be kept in constant use and moved up one side and down the other, as hereinafter more fully described. The two sides of the machine are practically identical in construction.

The wrapping-cylinders 1 1$^a$ are mounted with freedom of rotation in suitable bearings formed in enlargements 2 2$^a$, projecting inwardly in zigzag form from the side castings of the machine, as shown in Fig. 2. These cylinders 1 1$^a$ are provided with pinions 3 3$^a$, which intermesh with rack-bars 4 4$^a$, adapted to be reciprocated up and down by means of gear-wheels 5 and 5$^a$, an idler-wheel 6 being interposed between the wheels 5 and 5$^a$, so that the rack-bars 4 4$^a$ may be reciprocated simultaneously, but in opposite directions. One of the gear-wheels, as 5, is loosely mounted on a shaft 8 and is connected to or has formed integral therewith a beveled pinion 7, intermeshing with an idler 9, which in turn intermeshes with the beveled gear 10, also loosely mounted upon the shaft 8. Between the gears 7 and 10 is arranged a double clutch mechanism, two members of such clutch mechanism being formed on the inner faces of the gears 7 and 10, while the other member 11 is keyed to the shaft 8, so as to rotate therewith, but having a freedom of movement longitudinal of the shaft, so that one or the other of the pinions 7 and 10 can be caused to rotate with the shaft, so that the gear-wheels 5 and 5$^a$ can be rotated alternately in opposite directions, thereby effecting alternate up-and-down reciprocation of the rack-bars 4 and 4$^a$. When the clutch 11 is in engagement with the beveled pinion 10, the beveled pinion 7 will be rotated by pinion 10 through the medium of the idler 9, thereby imparting rotation to the gear-wheel 5 in one direction. When the clutch is in engagement with the pinion 7, the gear-wheel 5 will be directly rotated thereby, but in the opposite direction. On the shaft 8 is keyed a gear-wheel 12, intermeshing with a pinion 13 on the power-shaft 14. On this shaft 14 is secured a worm 15, intermeshing with a worm-wheel on the vertical shaft 16 provided with a disk 17, having a cam-groove therein for the reception of a pin on an arm 18, extending from the lever 19. This bell-crank lever 19 has its other arm connected by a bar 20 to a lever 21, having its free end in engagement with the clutch 11. By this construction the reversal of the clutch, and consequent reversal of the direction of movement of the rack-bars 4 4$^a$, is effected.

As clearly shown in Figs. 3, 4, and 5, the cylinders 1 1$^a$ are provided with axial passages through which strand-wires are inserted, said strand-wires passing from suitable spools through grooved disks 22, loosely mounted on vertical shafts 23 23$^a$, and thence through the wrapping-cylinders to pulling-drums 24 24$^a$ and around idlers 25 25$^a$ to the spooling mechanisms. The spooling-up mechanisms are so driven as to maintain a constant tension upon the strand-wires, especially during the wrapping of the stay-wires around the latter. While the wrapping-cylinders are stationary for the insertion and removal of the stay-wire tubes, as hereinafter described, the grooves $a$ along said cylinders are held in alinement with notches in the castings 2 2$^a$, so that the tubes may be transferred to and from the cylinders, as shown in Figs. 3, 4, and 5. The movement of the tubes out of the cylinders to the carrying-blocks is effected by means of a series of pairs of pushers 28 28$^a$, the pairs corresponding in number to the wrapping-cylinders and arranged in alinement therewith, but just beyond the ends of the cylinders. These pushers 28 are arranged to slide in suitable openings in the side wall of the machine and have their inner ends notched, so as to straddle the strand-wires while pushing the tubes 27 from the grooves in the cylinders, as clearly shown in Figs. 7 to 10, inclusive. The outer ends of these pushers 28 28$^a$ are connected to arms 29 29$^a$ on vertical shafts 30 30$^a$, which are provided at their ends with arms 31 31$^a$, connected to bars 32 32$^a$, the bars on one side of the machine being adapted to be reciprocated by means of a lever 33, which is operated by a cam 34 on the vertical shaft 16, as clearly shown in Figs. 1 and 2. The reciprocation or movement of the bars on one side of the machine is transmitted to those on the opposite side by a bar 34$^a$, extending from an arm 35 on one of the shafts 30 on one side of the machine to an arm 35$^a$ on one of the shafts 30$^a$ on the opposite side of the machine, as clearly shown in Fig. 1. By the operation of these pushers the stay-wire tubes are forced into slots in shifting blocks 36 36$^a$, compressing springs 37 in said slots. These shifting blocks 36 36$^a$ are connected to levers 38 38$^a$, mounted on suitable pins projecting from the side of the inner frame of the machine, as shown in Fig. 3, and have their opposite ends connected together by links 39. By reference to Figs. 2 and 3 it will be seen that there are two sets or pairs of lifting-blocks for effecting each movement of the stay-wire tube from one wrapping-cylinder to the next. The two series of levers 38 and 38$^a$ on each side of the machine are connected by a bar 38$^c$, extending from one end of a lever of one of the series to the end of the corresponding lever of the other series on the same side of the machine, as shown in Fig. 2. One lever 38$^b$ of one of the series on each side are secured to short shafts 40 40$^a$, (illustrated in dotted lines in Fig. 3,) having at their inner ends beveled pinions 41 41$^a$, intermeshing with beveled pinions 42 and 43, which are loosely mounted upon the vertical shaft 16. These beveled pinions 42 and 43 are adapted to be connected with the shaft 16 alternately by means of a movable clutch member 44, adapted to be shifted up and down in accordance with the requirements of the operation of the machine by means of a suitable bell-crank lever 45, having one end connected to the clutch member 44, while the opposite end is in engagement with a cam 46 on the shaft 16. By means of the reversal of this clutch the shifting blocks 36 36$^a$ are raised and lowered alternately, so as to effect a movement of the stay-wire tubes up on one side of the machine and down on the other to the next adjacent wrapping-cylinder. During this vertical movement or shifting of the stay-wire tubes the latter are held within the slots in the blocks 36 by means of the inner faces of the enlargements 2 2$^a$, as will be seen by reference to Figs. 3 and 9, and as soon as the tubes are brought opposite the slots in the castings and the grooves in the cylinders the tubes will be forced into the grooves by the springs 37, so that on the next rotation of the latter they will be carried around the strand-wires, thereby wrapping the stay-wires around such strand-wires. It will be noticed that the levers for lifting the stay-wire tubes to the top strand-wire and thence to the transfer mechanism are double-armed, as shown in Fig. 2. It will also be noticed that one of the levers for raising the stay-wire tubes to the lowest wrapping-cylinder is arranged out of the general line of the other levers, but is connected to one of the other levers by a link, so that all the levers will move in unison. From the upper wrapping-cylinder on one side and the lower wrapping-cylinder on the opposite side the stay-wire tubes are transferred from one side of the machine to the opposite, as shown in Figs. 4 and 5. The block 36$^d$ for raising the tube from the upper wrapping-cylinder on one side up to the transfer mechanism has a plain upper surface, onto which the tube is pushed by the upper pusher 28. As this block is raised the tube moves between the inner face of the lateral enlargements 2 and guide-pins 46 up into the path of movement of pins 47 on belts 48 and is carried by these pins along a shelf 49 to the opposite side of the machine. As the tube reaches the opposite side of the machine it drops down inclines 50 into slots in the upper shifting blocks 36$^a$ on that side, and as the said blocks are carried down the tubes are drawn between springs 51 and the faces of the enlargements 2ª, so that when the tube reaches the slot in the enlargements 2ª and the groove $a$ in the upper wrapping-cylinder 1ª the springs force the tubes into the grooves of the wrapping-cylinders. As soon as the wrap has been effected the pushers on this side of the machine will operate to force the tubes out into the next shifting block, whereby they are carried down to the next strand-wire. As the tubes are forced out of the lower wrapping-cylinder 1ª on this side of the machine they are forced out by the lower pushers 28ª and drop between guides 52 and the faces of enlargements onto a transfer-belt 53 provided with pins 54, which carry the tube to the opposite side of the machine and force it up into inclined slots 55, compressing springs 56. The lower shifting-blocks 36 on this side of the machine then drop below the position of the tube, which will be forced out onto the shifting-blocks as the pins of the transfer-belt pass beyond it and will be carried by said blocks up to the lower wrapping-cylinder, into which it is forced by a spring 57, whence it is carried up step by step to the successive wrapping-cylinders, as shown.

The transfer-belts 48 are mounted on suitable pulleys 58 on shafts 59 59ª, arranged at opposite sides of the machine, one of said shafts, as 59, being driven from the shaft 8 by suitable gear-wheels 60, as shown in Fig. 1, a clutch mechanism 61 being interposed between the shaft 8 and the member of the gearing mounted thereon, so that the belts will operate intermittently at the proper times. This clutch mechanism 61 is shifted by a lever 62, which is connected by a rod 63 to a lever 64, said lever being in turn connected by a rod 65 to a bell-crank lever 66, arranged to be shifted by a cam 67 on shaft 16. The lower transfer-belts 53 pass around pulleys 68 on shafts 69, arranged on opposite sides of the machine, and one of the shafts is driven from the shaft 59 by a series of belts 70, as shown in Fig. 3. During the transfer of the tubes from one side of the machine both above and below stay-wires are fed into the tubes by means of feed-rollers 71 and 71ª, one pair 71 arranged to feed into the tubes when carried along the shelf 49 and the other pair to feed into the tubes while being transferred across the lower end of the machine. The upper feed-rollers 71 are secured to vertical shafts 72 72, which have beveled pinions keyed thereto and adapted to intermesh with corresponding pinions on shaft 73. A beveled pinion 74 is also secured to the shaft 73 and intermeshes with a pinion 75, loosely mounted on shaft 8. A clutch mechanism is employed to connect pinion 75 with shaft 8, one member of the clutch being secured to or formed on the pinion 75, while the other member, 76, of the clutch is so connected to the shaft as to rotate therewith, but be free to move along it. This clutch member is shifted by means of lever 64, which, as before stated, is shifted by means of cam 67 on shaft 16, operating through bell-crank lever 66. One of the vertical shafts 72 is extended downwardly and is provided at its lower end with a beveled pinion 77, intermeshing with a similar pinion on shaft 78, which is provided with a second pinion 79, intermeshing with a similar pinion on the vertical shaft carrying one of the lower feed-rolls 71ª. A gear-wheel 80 is keyed to this vertical shaft and intermeshes with a corresponding wheel on the shaft carrying the other feed-roll 71ª. The stay-wires may be cut into lengths before being fed into the tubes or may be drawn from spools and cut after being fed by any suitable form of shear mechanism, as indicated at 81 81ª. The tubes and stay-wires are preferably made of a length sufficient to make one stay from the top to the bottom wire of the panel.

It will be observed by reference to Fig. 2 that although a stay-wire is being applied to each strand-wire at the same time the effect is similar to simultaneously applying one single strand-wire to the several stay-wires at one time. The operative ends of the wrapping-cylinders are arranged in different vertical planes separated by a distance equal to the desired distance between stay-wires, and as the strand-wires are fed forward a distance equal to the distance between the stay-wires after each wrapping operation the strand-wire tubes while being shifted from one wrapping-cylinder to the other will be shifted longitudinally as well as vertically an equal distance by the movement of the lifting-blocks.

The spools for winding the completed fence consist of a series of three or more vertical rods or tubes 82 82ª, having their ends arranged in openings in plates or disks 83 83ª, secured to the under and upper sides, respectively, of gear-wheels 84 84ª. These gear-wheels intermesh with gear-wheels 85 85ª, secured to the shafts 23 23ª. These shafts are provided at their upper and lower ends, respectively, with pulleys 86 86ª, around which pass belts 87 87ª, said belts also passing around pulleys 88 88ª on the shafts of the drums 24 24ª. On the upper ends of the shafts of these drums are secured beveled pinions 89 89ª, intermeshing with corresponding pinions 90 90ª, one of these pinions, as 90, being loosely mounted upon the shaft 8 and the other one on a short counter-shaft 91ª, which is also provided with a pinion intermeshing with a pinion 92 on the shaft 8. The pinion 90 is formed on or secured to a sleeve carrying the pinion 60, and through this sleeve passes the shaft 8, as shown in Fig. 1. This sleeve is adapted to be connected at proper times with the shaft 8 by the clutch mechanism 61, heretofore referred to. The pinion 90ª is adapted to be connected to the shaft 91ª by means of a clutch 93, the movable member of which is shifted by a lever 94, arranged to be operated by a cam-disk 95 on the shaft 16. The cams 67 and 95 are constructed and arranged to operate simultaneously, so that the onward movements of the two sets of strand-wires will be simultaneous, or practically so. The vertical shaft carrying the upper disks 83 83 are supported as against vertical movement in their bearings, while the lower disks and their gear-wheels are loosely mounted on vertical pins 96 96$^a$, which are externally threaded and pass through nuts 97 97$^a$, which are supported on sockets 98 98$^a$. By rotating these nuts, which are formed with a hand-grip, these supporting-pins may be raised or lowered, so that the rods 82 82$^a$ may be withdrawn from the openings in the disks and permit of the removal of the bundle of completed fence as desired.

I claim herein as my invention—

1. In a machine for making wire fabric, the combination of a series of wrappers, means for rotating said wrappers around strand-wires and means for simultaneously shifting stay-wires from one wrapper to the next progressively along the series, substantially as set forth.

2. In a machine for making wire fabric, the combination of a series of wrapping-cylinders having axial openings therethrough and provided with eccentric grooves or notches for the reception of the stay-wires, means for rotating the cylinders, and means for simultaneously shifting the stay-wires from the groove in one cylinder to the groove in another cylinder progressively along the series, substantially as set forth.

3. In a machine for making wire fabric, the combination of a series of wrapping-cylinders having axial openings therethrough and provided with eccentric grooves or notches, means for rotating the cylinders, carriers adapted to receive the stay-wires, and means for simultaneously shifting said carriers from the notch or groove in one cylinder to the notch or groove in another cylinder, substantially as set forth.

4. In a machine for making wire fabric, the combination of a series of wrapping-cylinders having axial openings therethrough and provided with eccentric grooves or notches, means for rotating said cylinders, carriers adapted to receive the stay-wires, pushers for forcing the wires out of the grooves or notches in the cylinders, blocks for shifting the wires from position in front of one cylinder to position in front of another cylinder, and means for shifting the wires from the carrying-blocks into the grooves or notches in the cylinders, substantially as set forth.

5. In a machine for making wire fabric, the combination of two series of wrapping-cylinders having axial openings therethrough and provided with eccentric grooves or notches, means for rotating the cylinders, tubes adapted to receive the stay-wires, means for shifting the tubes from one wrapping-cylinder to another progressively along the two series, and means for transferring the tubes from one series of wrapping-cylinders to the other, substantially as set forth.

6. In a machine for making wire fabric, the combination of two series of wrapping-cylinders provided with axial openings therethrough and having eccentric grooves or notches, means for rotating said cylinders, tubes adapted to receive the stay-wires, means for shifting the tubes from one wrapping-cylinder to another progressively along the two series, means for transferring the tubes from one series of cylinders to the other series, and means for feeding wire into said tubes, substantially as set forth.

In testimony whereof I have hereunto set my hand.

GOTTHOLD LANGER.

Witnesses:
DARWIN S. WOLCOTT,
F. E. GAITHER.